Figure 1:
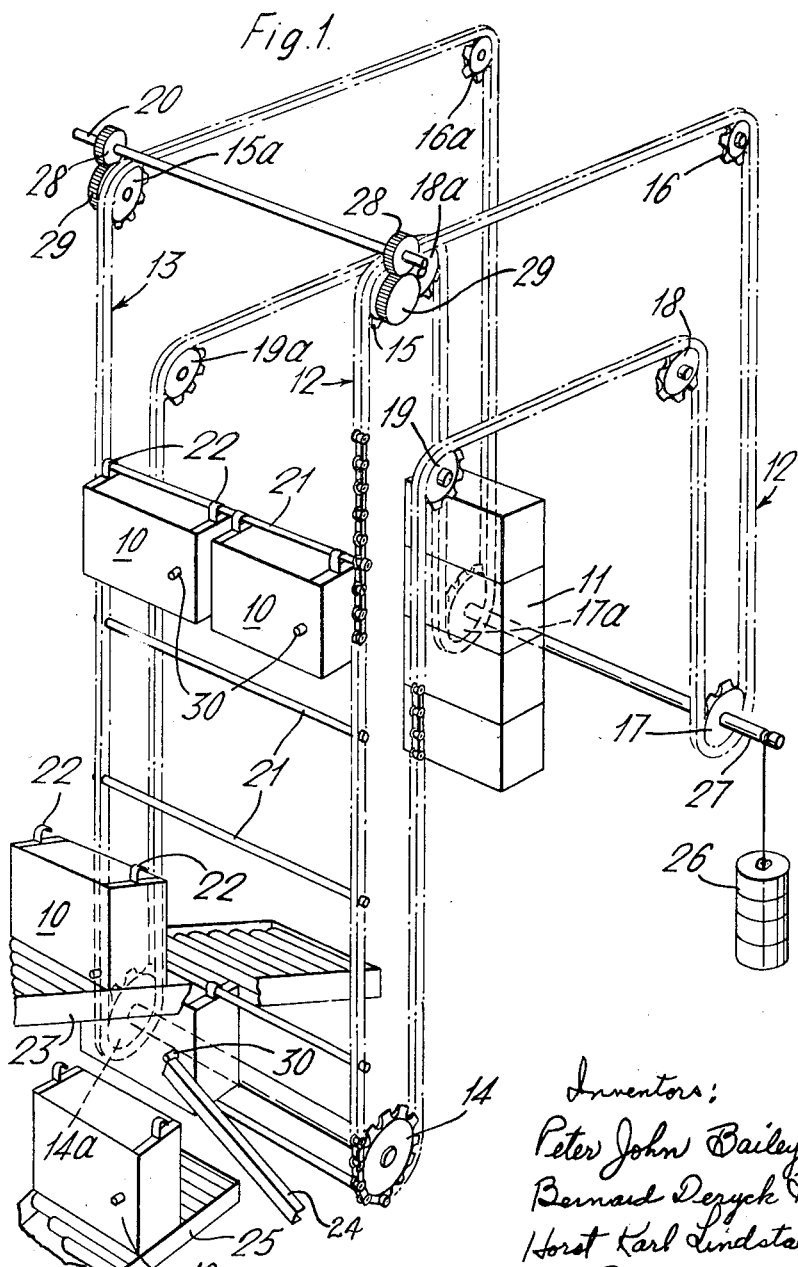

Dec. 21, 1965   P. J. BAILEY ETAL   3,224,562
CONVEYOR SYSTEMS

Filed Nov. 7, 1962   2 Sheets-Sheet 2

Inventors
Peter John Bailey
Bernard Deryck Baines
Horst Karl Lindstaedt
By
Karl W. Flocks
Attorney

United States Patent Office 3,224,562
Patented Dec. 21, 1965

3,224,562
CONVEYOR SYSTEMS
Peter John Bailey, Starcross, Devon, Bernard Deryck Baines, Burnham, and Horst Karl Lindstaedt, Uxbridge, England, assignors to Nuclear Chemical Plant Limited, London, England, a company of Great Britain
Filed Nov. 7, 1962, Ser. No. 236,009
Claims priority, application Great Britain, Nov. 10, 1961, 40,410/61; Mar. 9, 1962, 9,287/62
2 Claims. (Cl. 198—131)

This invention in concerned with conveyor systems.

It is an object of the invention to provide a conveyor system for moving artices adjacent to means for treating the articles in a desired manner. The invention is particularly, but not exclusively, applicable to a conveyor system for moving articles required to be sterilised adjacent to a radioactive source of sterilising radiation so that the articles are satisfactorily exposed to the radiation.

The invention provides a conveyor system for moving articles adjacent to treatment means from at least two opposite sides of which there is an emission to which it is desired to subject the articles, which system comprises an endless conveyor having at least two substantially parallel, upright portions spaced apart for passing the treatment means adjacent said opposite sides thereof, support means being provided for carrying the articles to be treated so that each article has the same orientation with respect to the system on all of the upright conveyor portions. Thus, on at least one vertical conveyor portion one side of the article is exposed to the treatment means and on at least one other vertical conveyor portion the other side of the article is exposed to the treatment means.

For use where the treatment means is a source of penetrating radiation, the conveyor preferably includes upright portions disposed outside the first-said two upright conveyor portions and adjacent and substantially parallel thereto. The time of exposure of the articles to the radiation is thereby increased.

Means may be provided for displacing the articles horizontally on the conveyor after they have completed one circuit of the conveyor, the articles then being carried round for a further circuit of the conveyor in a different vertical plane. The treatment source should be arranged at a position between the two different planes in which the articles are moved so that part of each article is satisfactorily treated on one circuit and the remainder of the article is satisfactorily treated on the next circuit.

In a preferred form of the invention, the conveyor comprises two endless chains running on chain wheels and having horizontal cross-bars connected between them, on which cross-bars the articles to be treated can be supported, e.g. by hooks. Horizontal displacement of the articles on the bars can be effected by a guide rail. The articles may conveniently be fed to the endless conveyor on an inclined roller conveyor and also removed on an inclined roller conveyor arranged to engage an article when it has completed its circuit or circuits and support it so that the movement of the endless conveyor disengages the bar from the hooks, when the article can slide down the roller conveyor.

It has heretofore been customary to employ a single conveyor on to which the articles are delivered at a feed point distant from the treatment means and which traverses the articles past the treatment means before they are removed from the conveyor at a disposal point, which is also distant from the treatment means. The speed of the conveyor is dictated by the time for which it is required to expose the articles to the treatment means. The distance of the feed point and the disposal point from the treatment means is determined by various factors, for instance, where the treatment means is a radioactive source of sterilising radiation, the feed point and disposal point will be outside a shield enclosing the irradiation source and its associated equipment.

In a conveyor system in accordance with the present invention it is preferred that feed and disposal conveyor means is provided for feed articles from a feed point to said endless conveyor at a point adjacent to the position of the treatment means and for transferring treated articles to a disposal point from a point on the endless conveyor adjacent to the position of the treatment means, the feed and disposal conveyor means being operable to convey the articles at a speed different from that of the endless conveyor. Thus, the speed of movement of articles to and from the vicinity of the treatment means is not restricted to the speed of movement of the articles past the treatment means, but may be substantially higher, and greater flexibility and economy of operation may be obtained.

This arrangement is particularly useful where the feed and disposal point are so located that articles must travel a substantial distance to and from the treatment means, e.g. where the distance of each of those points from the treatment means is of the same order as, or greater than, the distance of travel of an article on the endless conveyor.

Preferably the speed of the feed and disposal conveyor means is controllable independently of the speed of the endless conveyor. Normally, timing means would be provided for controlling the operation of the feed and disposal conveyor means in accordance with the operation of the endless conveyor so that articles are delivered to and removed from the endless conveyor at desired times.

In one form of the invention, separate feed and disposal conveyors each comprises a rail track having a trolley thereon. A reversing device may be provided at each end of the rail track operated by a timing device controlled in accordance with the travel of the treatment conveyor. The trolleys may be self-propelled electric trolleys or they may be cable driven.

In a preferred construction, each chain passes round chain wheels (conveniently five wheels) to form a closed loop in the shape of an inverted U so that the treatment means can be disposed between the two chains at a position between the arms of the U.

The following is a description, by way of example, of conveyor systems in accordance with the present invention for use in sterilising surgical catgut or other material by irradiation. Reference is made to the accompanying drawings, in which FIGURE 1 is an isometric drawing showing the essential parts of one form of conveyor system, and FIGURE 2 is an isometric drawing of an irradiation plant including a conveyor system substantially as shown in FIGURE 1, parts of the personnel shield and walls being shown cut away for clarity of illustration.

Figure 2:
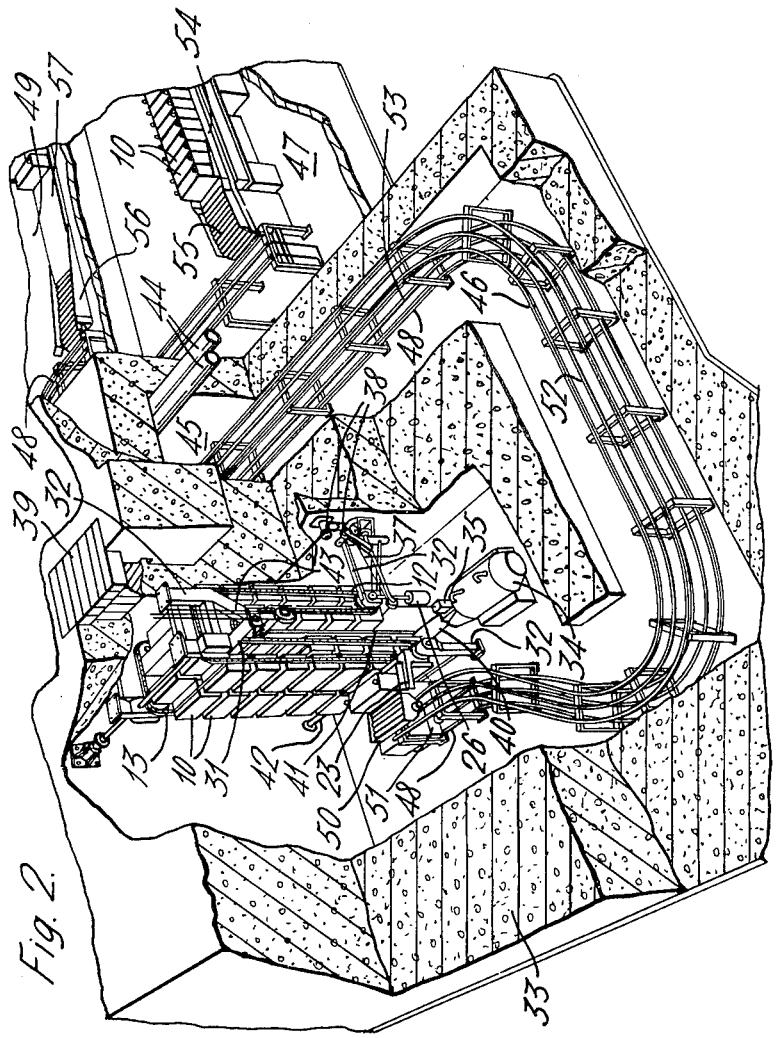

Referring to FIGURE 1, the surgical catgut or other material to be irradiated is contained in boxes or containers 10 which are traversed past a radioactive source of sterlising radiation 11 (e.g. cobalt-60). The conveyor system comprises two endless chains 12 and 13 which are similarly arranged in parallel vertical planes. The chain 12 runs vertically up from chain wheel 14 to chain wheel 15, round that wheel and then horizontally to chain wheel 16. After passing round wheel 16, chain 12 runs vertically down to chain wheel 17, round the wheel and vertically up to chain wheel 18, round chain wheel 18, then horizontally to chain wheel 19. The chain passes round wheel 19 and down to chain wheel 14. Chain 13 runs round chain wheels 14a, 15a, 16a, 17a, 18a, 19a disposed co-axially with the chain wheels of chain 12. Each chain therefore runs in a loop in the general configuration of an inverted U. The vertical portions of the chains between the wheels 14, 14a, and 19, 19a and 17, 17a and 18, 18a respectively are therefore the nearest adjacent to the source 11, while the other vertical portions of the chains are outside the vertical portions nearest to the source and parallel and adjacent to those portions. The chains are driven by a drive shaft 20 which is connected through gear wheels 28, 29 to chain wheels 15 and 15a. Weights 26 carried by a shaft 27 on which are mounted chain wheel 17 and the corresponding chain wheel 17a of chain 13 tension the two chains. Secured between the chains 12 and 13 at regular intervals are horizontal cross-bars 21 (only some of which are shown in the drawing). Each box 10 has two hooks 22 by which it can hang from a cross-bar 21. In operation, a box 10 slides down an inclined roller conveyor 23 and the hooks engage over a bar 21 moving slowly upwards between chain wheels 14, 14a and 15, 15a. The box 10 is thus lifted and carried first up, then across, then down, then up again, across again and down. The radiation source 11 is disposed between the arms of the inverted U formed by the chain and bar conveyor and radiates towards both arms. Thus, each box 10 is exposed to radiation while being traversed between chain wheel 14 and chain wheel 17 and is then exposed to more intense radiation, owing to closer proximity to the radiation source, while being moved between chain wheel 17 and chain wheel 14. The boxes are free to swing on the bars as a result of the hook suspension and each box therefore always hangs below the bar with the same orientation with respect to the system as a whole. As a result, when moving between chain wheels 14, 14a and chain wheels 15, 15a and between chain wheels 19, 19a and chain wheels 14, 14a one side of a box is directly exposed to radiation, and when moving between chain wheels 16, 16a and chain wheels 17, 17a and between chain wheels 17, 17a and chain wheels 18, 18a the other side of the box is directly exposed to radiation. To increase the efficiency of utilisation of the radiation and to ensure that each box is adequately irradiated, the bars 21 are of such a length that the boxes, after one complete circuit of the conveyor in one vertical plane, can be horizontally displaced for a distance slightly greater than their length. Horizontal displacement of the boxes is effected by a fixed inclined guide-rail 24 which is engaged by a stud 30 on each box as the box commences its upward travel from chain wheels 14, 14a after completing one circuit of the conveyor. After horizontal displacement, the box is carried round by the conveyor for another circuit before being discharged as described hereinafter. Thus, for the greater part of the length of the conveyor, two boxes are carried side-by-side by each cross-bar 21 (for clarity of illustration only some boxes are shown in the drawing). The radiation source 11 is arranged symmetrically with respect to the two horizontally-displaced sets of boxes and is of substantially less width than the overall width of the two sets of boxes.

Towards the end of its second circuit, each box moves downwards from chain wheels 19, 19a towards chain wheels 14, 14a. When the box nears the lowermost point of travel of the conveyor, the bottom of the box engages and is supported by an inclined roller conveyor 25. The continued downward movement of the conveyor causes the cross-bar 21, which carried the box, to move down clear of the hooks 22 on the box. The box, being free of the bar, then runs down the roller conveyor 25.

It will be appreciated that the boxes are made of material which does not absorb a substantial amount of the radiation from source 11.

Referring now to the plant shown in FIGURE 2, an endless conveyor is used which is constructed as shown in FIGURE 1 except that a single chain wheel 31 replaces the two chain wheels at the top of the inside runs of each chain of the conveyor. The chain wheels are mounted in a main support framework 32 disposed in a cell 33 which constitutes a shield to guard operating personnel against the radiation. The cell contains an irradiation source container 34 (in which the sources are introduced into and removed from the cell) having a sealing plug 35 suspended from an arm 36 by a cable 37 which passes round pulleys 38 and out of the cell to external operating means. The container 34 is moved into and out of the cell by a hoist (not shown) through a hoist well normally closed by a plug 39. The irradiation sources are guided into the position shown in FIGURE 1 by means of a feed guide 40 and a jig slide 41, the sources being moved by a feed rod (not visible in the drawing) passing into the cell through a horizontal guide tube 42 and by lifting tackle 43 passing up through the roof of the cell, the feed rod and lifting tackle being operated by external operating means. Ventilation ducts 44 extend into the cell interior through an access corridor 45. A rail track 46 leads from an external feed bay 47 through the corridor 45 into the cell 33 and terminates at the roller conveyor 23. A second rail track 48 leads from the roller conveyor 25 out of the cell through the corridor 26 into a disposal bay 49. The rail track 48 is arranged below the rail track 46 while they follow the same path in the cell and the corridor. Two electric trolleys 50 and 51 run on tracks 46 and 48 respectively. These two trolleys are self-propelled, carrying their own electric motors supplied with current by central electric feed rails 52 and 53 in the tracks 46 and 48. Each trolley has a platform provided by rollers with axes parallel to the direction of movement of the trolley so as to facilitate movement of containers on to and off the trolley sideways. Reversing devices are provided at the end of each track together with a timing device operated in accordance with the movement of the endless conveyor so that each trolley enters the cell on predetermined occasions. Trolley 50 receives an unsterilised container 10 from a conveyor belt 54 in the feed bay 47, the container being transferred from the belt to the trolley down an inclined roller conveyor 55. The trolley then moves along the track 46 to deliver the container to the inclined roller conveyor 23. At the conveyor 23, the plane of the track 46 is tilted sufficiently to cause the container to run off the trolley on to the conveyor 23. The container is engaged by the endless conveyor, traversed around the radioactive sources and then transferred to the trolley 51 as hereinbefore described. The trolley 51 moves along the track 48 to the disposal bay 49, where the end of the track 48 is inclined sideways so that the sterilised container slides off the trolley and down an inclined roller conveyor 56 on to a conveyor belt 57. The trolleys 50 and 51 return empty to the feed bay 47 and treatment conveyor respectively to collect further containers.

The speed of the treatment conveyor (i.e. of the chains 12, 13) is selected to ensure satisfactory irradiation of the containers. The trolleys 50 and 51 operate to deliver containers to, and remove containers from, the treatment conveyor at appropriate times, but the actual speed of movement of a trolley along its track can be of any reasonable value irrespective of the speed of the treatment conveyor.

Although in the plant shown in FIGURE 2 separate feed and disposal conveyors lead to the treatment conveyor, it will be understood that a single conveyor may lead to the treatment conveyor, this single conveyor serving for both feed and disposal. Such a single conveyor for example may operate on a rapid shuttle basis or may have a trolley for carrying two boxes of material in separate positions thereon, one position being used for unsterilised material and the other for sterilised material.

We claim:

1. A conveyor system for subjecting objects to penetrating radiation from a radiation source, comprising an endless conveyor having at least two substantially parallel, upright portions passing adjacent the source on each of two opposite sides thereof and disposed one beyond another relative to the source, the conveyor comprising two endless chains and cross-bars connected between the chains, containers having hooks engageable over the cross-bars to swingably carry the containers, each cross-bar being adapted to slidably carry a plurality of containers side by side, an inclined roller conveyor for feeding each container to the endless conveyor so that its hooks are engaged and lifted by a cross-bar at one end thereof, an inclined rail engageable by the containers to displace them horizontally on the bars during their passage on the conveyor, and an inclined roller conveyor for engaging each container when it has completed its travel on the endless conveyor and supporting it so that the movement of the endless conveyor disengages the cross-bar from the hooks, when the container can slide down the roller conveyor.

2. A conveyor system for subjecting objects to penetrating radiation from a radiation source, comprising an endless conveyor having at least two substantially parallel, upright portions passing adjacent the source on each of two opposite sides thereof and disposed one beyond another relative to the source, support means on the conveyor adapted to carry in close succession and side by side objects to be subjected to said radiation, means for feeding said objects to the conveyor, means for removing objects from the conveyor, and means for traversing objects sideways on the support means at an intermediate point in their travel on the conveyor.

References Cited by the Examiner
UNITED STATES PATENTS

| 751,852 | 2/1904 | Henry | 198—163 |
| 2,489,918 | 11/1949 | Menges | 250—52 X |
| 3,142,759 | 7/1964 | Jefferson | 250—52 X |

SAMUEL F. COLEMAN, *Primary Examiner.*

WILLIAM B. LA BORDE, *Examiner.*